United States Patent
Xu et al.

(10) Patent No.: US 11,928,771 B2
(45) Date of Patent: Mar. 12, 2024

(54) LIGHT SOURCE DETECTION FOR EXTENDED REALITY TECHNOLOGIES

(71) Applicant: GUANGDONG OPPO MOBILE TELECOMMUNICATIONS CORP., LTD., Guangdong (CN)

(72) Inventors: Yi Xu, Palo Alto, CA (US); Shuxue Quan, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 47 days.

(21) Appl. No.: 17/832,792

(22) Filed: Jun. 6, 2022

(65) Prior Publication Data
US 2022/0301256 A1    Sep. 22, 2022

Related U.S. Application Data

(63) Continuation of application No. PCT/CN2020/130768, filed on Nov. 23, 2020.
(Continued)

(51) Int. Cl.
*G06T 15/06*    (2011.01)
*G06T 7/70*    (2017.01)
(Continued)

(52) U.S. Cl.
CPC .............. *G06T 15/06* (2013.01); *G06T 7/70* (2017.01); *G06T 19/006* (2013.01); *H04N 23/73* (2023.01); *G06T 2207/30244* (2013.01)

(58) Field of Classification Search
CPC ......... G06T 15/06; G06T 7/70; G06T 19/006; G06T 2207/30244; G06T 2207/10016; G06T 7/73; H04N 23/73
See application file for complete search history.

(56) References Cited

U.S. PATENT DOCUMENTS 11,468,662 B2 * 10/2022 Harrison ................... G06T 7/73
2008/0211813 A1    9/2008 Jamwal et al.
(Continued)

FOREIGN PATENT DOCUMENTS

| CN | 102696057 A | 9/2012 |
| CN | 105844714 A | 8/2016 |

(Continued)

OTHER PUBLICATIONS

Extended European Search Report for EP Application 20896599.6 dated Dec. 12, 2022. (8 pages).
(Continued)

*Primary Examiner* — Michael Le
(74) *Attorney, Agent, or Firm* — Young Basile Hanlon & MacFarlane, P.C.

(57) ABSTRACT

An exemplary method of detecting a light source using an electronic device having a camera and a sensor may include: scanning a real environment using the camera to establish an environment map of the real environment; capturing, using the camera, a first image of a real light source from a first location in the real environment and a second image of the real light source from a second location in the real environment; tracking, using the sensor, a first position and a first orientation of the camera in the environment map while the first image is captured, and a second position and a second orientation of the camera in the environment map while the second image is captured; and computing a position of the real light source in the environment map based on the first position, the first orientation, the second position, and the second orientation.

17 Claims, 4 Drawing Sheets

Related U.S. Application Data

(60) Provisional application No. 62/944,639, filed on Dec. 6, 2019.

(51) Int. Cl.
    *G06T 19/00*    (2011.01)
    *H04N 23/73*    (2023.01)

(56) References Cited

U.S. PATENT DOCUMENTS

| | | | | |
|---|---|---|---|---|
| 2015/0131851 | A1* | 5/2015 | Bernal | G06T 7/248 382/103 |
| 2015/0279113 | A1* | 10/2015 | Knorr | G06T 7/11 345/633 |
| 2016/0196665 | A1* | 7/2016 | Abreu | G06T 11/00 345/427 |
| 2017/0118400 | A1* | 4/2017 | Hesch | H04N 23/684 |
| 2018/0020161 | A1* | 1/2018 | Kweon | G06T 3/047 |
| 2018/0350128 | A1 | 12/2018 | Bakalash et al. | |
| 2019/0005677 | A1* | 1/2019 | Grau | G06T 7/73 |
| 2020/0244895 | A1* | 7/2020 | Guérin | H04N 23/698 |
| 2021/0110598 | A1* | 4/2021 | Evans | G06F 3/011 |

FOREIGN PATENT DOCUMENTS

| | | |
|---|---|---|
| CN | 106204744 A | 12/2016 |
| CN | 107808409 A | 3/2018 |
| CN | 110291565 A | 9/2019 |

OTHER PUBLICATIONS

Kolivand et al., "Shadow Generation in Mixed Reality: A Comprehensive Survey", IETE Technical Review, vol. 32, No. 1, Jan.-Feb. 2015. (3-15 pages).

Kan et al., "Differential Irradiance Caching for fast high-quality light transport between virtual and real worlds", IEEE International Symposium on Mixed and Augmented Reality, Oct. 1, 2013. (133-141 pages).

International Search Report for PCT Application PCT/CN2020/130768 dated Feb. 19, 2021. (9 pages).

Kan et al., "High-Quality Reflections, Refractions, and Caustics in Augmented Reality and their Contribution to Visual Coherence", <http://www.peterkan.com/download/ismar2012.pdf>, Nov. 5-8, 2012. (10 pages).

Frahm et al, "Markerless Augmented Reality with Light Source Estimation for Direct Illumination",http://data.mip.informatik.unikiel.de:555/wwwadmin/Publica/2005/Markerless-Augmented-Reality-with-Light-Source-Estimation-for-Direct-Illumination.pdf, Nov. 30, 2005 to Dec. 1, 2005. (10 pages).

\* cited by examiner

LIGHT SOURCE DETECTION FOR EXTENDED REALITY TECHNOLOGIES

CROSS-REFERENCE TO RELATED APPLICATION(S)

This application is a continuation of International Application No. PCT/CN2020/130768, filed Nov. 23, 2020, which claims priority to U.S. Provisional Patent Application No. 62/944,639, filed Dec. 6, 2019, the entire disclosures of both of which are hereby incorporated by reference.

TECHNICAL FIELD

This disclosure relates in general to extended reality technologies, and more specifically, and without limitation, to detection of real light sources for object rendering for extended reality technologies.

BACKGROUND

Extended reality technologies, such as virtual reality (VR), augmented reality (AR), mixed reality (MR), and the like, have made rapid progress. In some implementations of extended reality technologies, such as AR and MR, the system implementing the various extended reality technologies includes devices that allow digitally reproduced virtual objects, such as 3D virtual objects, to be overlaid in an image of the real world environment, along with the real objects in the real world environment. In many cases, it can be challenging to present the virtual objects in a manner that may be perceived by a user of the extended reality technology to be real.

SUMMARY

Embodiments include a method of detecting a light source for implementing an extended reality session using an electronic device having a camera and a sensor unit. In some embodiments, the method may include: scanning, using the camera, a real environment to establish an environment map of the real environment. The method may also include capturing, using the camera, a first image of a real light source from a first location in the real environment. The method may further include tracking, using the sensor unit, a first position and a first orientation of the camera in the environment map while the first image may be captured. The method may also include capturing, using the camera, a second image of the real light source from a second location in the real environment that may be different from the first location. The method may further include tracking, using the sensor unit, a second position and a second orientation of the camera in the environment map while the second image may be captured. The method may also include computing, by one or more processors of the electronic device, a position of the real light source in the environment map based on the first position, the first orientation, the second position, and the second orientation of the camera.

In some embodiments, capturing the first image of the real light source may include reducing an exposure setting of the camera to a first exposure level. The first position and the first orientation of the camera may be tracked based at least in part on an image input from the camera while the exposure setting may be maintained at the first exposure level. In some embodiments, capturing the first image of the real light source may further include reducing the exposure setting of the camera to a second exposure level that may be below the first exposure level. The first image of the real light source may be captured at the second exposure level.

In some embodiments, the sensor unit may include an inertial measurement unit. The first position and the first orientation of the camera in the environment map may be tracked using the IMU while capturing the first image of the real light source. The second position and the second orientation of the camera in the environment map may be tracked using the IMU while capturing the second image of the real light source.

In some embodiments, the electronic device may include a mobile device. The method further may include continuously tracking a third position and a third orientation of the camera in the environment map using a SLAM module of the electronic device while the camera may move from the first location to the second location. In some embodiments, the camera may include a rectilinear lens.

In some embodiments, computing the position of the real light source in the environment map may include computing, by the one or more processors of the electronic device, a first direction in the environment map that may correspond to a direction from the camera at the first location to the real light source. The first direction may be computed based at least in part on the first orientation of the camera or the first image. In some embodiments, computing the position of the real light source in the environment map may further include computing, by the one or more processors of the electronic device, a second direction in the environment map that may correspond to a direction from the camera at the second location to the real light source. The second direction may be computed based at least in part the second orientation of the camera or the second image.

In some embodiments, the method may further include capturing, using the camera, a first image of the real environment. The method may also include overlaying a virtual object in the first image of the real environment. The method may further include simulating, via ray tracing, an effect of an interaction between the virtual object and the real light source based at least in part on the detected position of the real light source.

Embodiments may include an electronic device for detecting a light source for implementing an extended reality session. In some embodiments, the electronic device may include a camera, a sensor unit, one or more processors, and a memory. The memory may have instructions that, when executed by the one or more processors, may cause the electronic device to perform the following operations: establishing an environment map of a real environment based on information received from the camera; capturing, using the camera, a first image of a real light source from a first location in the real environment; tracking, using the sensor unit, a first position and a first orientation of the camera in the environment map while the first image may be captured; capturing, using the camera, a second image of the real light source from a second location in the real environment that may be different from the first location; tracking, using the sensor unit, a second position and a second orientation of the camera in the environment map while the second image may be captured; and computing, using the one or more processors, a position of the real light source in the environment map based on the first position, the first orientation, the second position, and the second orientation of the camera.

In some embodiments, capturing the first image of the real light source may include reducing an exposure setting of the camera to a first exposure level so as to achieve an overall 18% grey tone. In some embodiments, capturing the first image of the real light source may further include reducing the exposure setting of the camera to a second exposure level that may be below the first exposure level. The first image of the real light source may be captured at the second exposure level.

In some embodiments, the sensor unit may include an inertial measurement unit (IMU). In some embodiments, the first position and the first orientation of the camera in the environment map may be tracked using the IMU while capturing the first image of the real light source. In some embodiments, the second position and the second orientation of the camera in the environment map may be tracked using the IMU while capturing the second image of the real light source.

In some embodiments, the electronic device may include a mobile device. The instructions, when executed by the one or more processors, may further cause the electronic device to perform the following operation: continuously tracking a third position and a third orientation of the camera in the environment map using a SLAM module of the electronic device while the camera may move from the first location to the second location. In some embodiments, the camera may include a rectilinear lens.

In some embodiments, computing the position of the real light source in the environment map may include computing a first direction in the environment map that may correspond to a direction from the camera at the first location to the real light source. The first direction may be computed based at least in part on the first orientation of the camera or the first image. In some embodiments, computing the position of the real light source in the environment map may further include computing a second direction in the environment map that may correspond to a direction from the camera at the second location to the real light source. The second direction may be computed based at least in part on the second orientation of the camera or the second image.

In some embodiments, the instructions, when executed by the one or more processors, may further cause the electronic device to perform the following operations: capturing, using the camera, a first image of the real environment; overlaying a virtual object in the first image of the real environment; and simulating, via ray tracing, an effect of an interaction between the virtual object and the real light source based at least in part on the detected position of the real light source.

Embodiments may include a non-transitory machine readable medium having instructions for detecting a light source for implementing an extended reality session using an electronic device having a camera and a sensor unit. The instructions may be executable by one or more processors to cause the electronic device to perform the following operations: scanning, using the camera, a real environment to establish an environment map of the real environment; capturing, using the camera, a first image of a real light source from a first location in the real environment; tracking, using the sensor unit, a first position and a first orientation of the camera in the environment map while the first image may be captured; capturing, using the camera, a second image of the real light source from a second location in the real environment that may be different from the first location; tracking, using the sensor unit, a second position and a second orientation of the camera in the environment map while the second image may be captured; and computing, using the processor, a position of the real light source in the environment map based on the first position, the first orientation, the second position, and the second orientation of the camera.

In some embodiments, capturing the first image of the real light source may include: reducing an exposure setting of the camera to a first exposure level; capturing, using the camera, a third image of the real light source at the first exposure level; reducing the exposure setting of the camera to a second exposure level that may be below the first exposure level. The first image of the real light source may be captured at the second exposure level. In some embodiments, capturing the first image of the real light source may further include: comparing line features captured by the first image to line features capture by the third image; and responsive to determining that the first image captures no more line features than the third image, selecting the first image for subsequent analysis of the real light source.

In some embodiments, the sensor unit may include an inertial measurement unit (IMU). The first position and the first orientation of the camera in the environment map may be tracked using the IMU while capturing the first image of the real light source. The second position and the second orientation of the camera in the environment map may be tracked using the IMU while capturing the second image of the real light source.

In some embodiments, the electronic device may be a mobile device. The instructions may be executable by the one or more processors to further cause the electronic device to perform the following operation: continuously tracking a third position and a third orientation of the camera in the environment map using a SLAM module of the electronic device while the camera may move from the first location to the second location.

In some embodiments, computing the position of the real light source in the environment map may include computing a first direction in the environment map that may correspond to a direction from the camera at the first location to the real light source. The first direction may be computed based at least in part on the first orientation of the camera or the first image. In some embodiments, computing the position of the real light source in the environment map may further include computing a second direction in the environment map that may correspond to a direction from the camera at the second location to the real light source. The second direction may be computed based at least in part on the second orientation of the camera or the second image.

In some embodiments, the instructions may be executable by the one or more processors to further cause the electronic device to perform the following operations: capturing, using the camera, a first image of the real environment; overlaying a virtual object in the first image of the real environment; and simulating, via ray tracing, an effect of an interaction between the virtual object and the real light source based at least in part on the detected position of the real light source.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF DRAWINGS

The present disclosure is described in conjunction with the appended figures.

Figure 1:
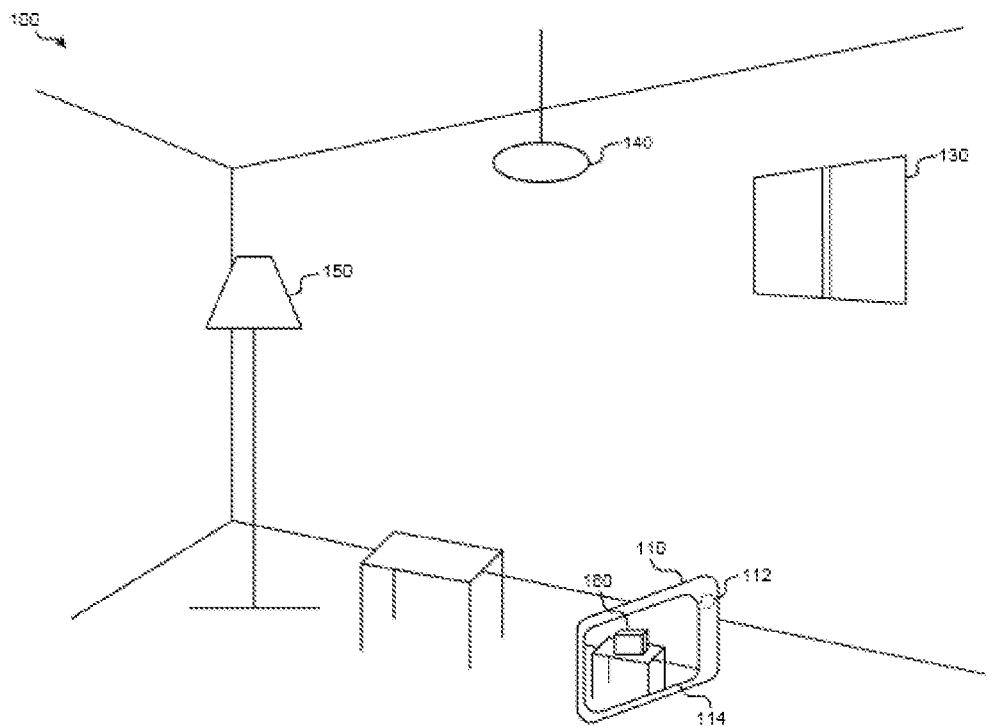
FIG. 1 is a simplified illustration of an environment in which an embodiment may be implemented.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

When implementing various extended reality technologies, such as VR, AR, MR, etc., ray tracing (RT) and rasterization can be used as rendering techniques for rendering representation of virtual objects into an image of a real world environment. RT is a rendering technique for generating an image by tracing rays as pixels in an image plane and simulating the effects of their interactions with virtual objects. It can be very computationally expensive. Thus, real-time applications, particularly commercial AR applications, usually use a rasterization technique as their rendering approach. Compared to RT, rasterization only computes the shading of each pixel regarding light sources; therefore, it is very fast.

There are some research and commercial efforts that aim to enable RT in real time AR applications. For example, some have proposed to use ray tracing to rendering global illumination (GI) effects such as reflections, refractions, and caustics in AR scenarios by using a predefined digital model of the real geometry. To properly render the virtual objects so that the lighting effects match the actual environment, light source estimation is required. Some have used a fisheye camera to capture an image of the environment and compute light source positions and intensities using image processing techniques. More specifically, thresholding is first applied to the captured environment image by the fisheye camera. Blob detection and contour tracing is used to detect the biggest sources of high incoming radiance. A separate, second camera is utilized to implement the AR scenario in which a virtual object is rendered. Some have attempted to bring RT to mobile platforms by manually specifying a virtual light source for the RT engine, instead of detecting and/or estimating a real-world light source.

In the present disclosure, embodiments for real-world light source detection and/or estimation in extended reality applications, such as AR, MR, or other extended reality applications are described. Real-world light source detection and/or estimation may be implemented using a mobile device. In some embodiments, a camera of the mobile device may be used for both the light source detection/ estimation and subsequent extended reality session implementation. Specifically, a user of the mobile device can be guided to point the camera to various light sources in the real environment to capture one or more images of each light source, and estimate the light source position, color, intensity, size, shape, and/or various other characteristics of the light source. Detecting and/or estimating real light sources enables improved rendering capability and/or functionality for the various extended reality applications.

FIG. 1 is a simplified illustration of an environment 100 in which some embodiments may be implemented. The environment 100 may also be referred to as a real-world or real environment 100 to distinguish it from a virtual environment. Although an indoor environment 100 is illustrated in FIG. 1, the various embodiments described herein may also be implemented in an outer environment or any other environment where an extended reality session may be carried out.

An extended reality session, such as an AR session, MR session, etc., may be implemented in the environment 100 using an electronic device 110. The electronic device 110 may include a camera 112 configured to capture images and/or videos of the environment 100 for implementing the extended reality session and a display 114 for displaying the image captured by the camera 112 and for presenting one or more rendered virtual objects. The electronic device 110 may include additional software and/or hardware for implementing the extended reality session and various other functions of the electronic device 110, including the functionality of light source detection and/or estimation as will be discussed in more detail below. Although a tablet is illustrated in FIG. 1 as one example of the electronic device 110, the various embodiments described herein may not be limited for implementation on a tablet. The various embodiments may be implemented using many other types of electronic devices, including but not limited to various mobile devices, handheld devices, such as smart phones or tablets, hands-free devices, wearable devices, such as head-mounted displays (HMD), optical see-through head-mounted displays (OST HMDs), or smart glasses, or any devices that may be capable of implementing an AR, MR, or other extended reality applications. Although in the embodiment shown in FIG. 1, the electronic device utilizes a camera for capturing images and/or videos of the environment and a display for displaying or rendering the camera view with or without a virtual object overlaid, the light source detection and/or estimation methods described herein may be implemented without rendering the camera view on a display. For example, some OST-HMD and/or smart glasses may not include a display for displaying or rendering the camera view. The OST-HMD and/or smart glasses may include a transparent display for the user to see the real world environment through the transparent display. Nonetheless, the light source detection and/or estimation methods described herein may be implemented for the OST-HMD and/or smart glasses to detect and/or estimate the position, size, shape, color, intensity, and various other characteristics of the light source for proper rendering of virtual objects.

As shown, the environment 100 may include various light sources. The various light sources may include one or more natural light sources, such as natural light coming from a window 130, and/or one or more man-made light sources, such as a ceiling lamp 140, a floor lamp 150, and the like. During the implementation of the extended reality session, a virtual object 160, such as a three dimensional (3D) virtual object, may be rendered and overlaid on an image of the environment 100 captured by the camera 112 and displayed on the display 114, appearing to be real or perceived to be real by a user. As can be appreciated, light or rays emitted or radiated from all the various light sources may affect the rendering of the virtual object 160. Thus, to improve the rendering quality or properly simulating the effect of the interaction between the light from the various light sources and the virtual object 160, detection and/or estimation of the position, intensity, color, and many other characteristics or properties of each light source may be performed prior to carrying out the rendering.

Figure 2:
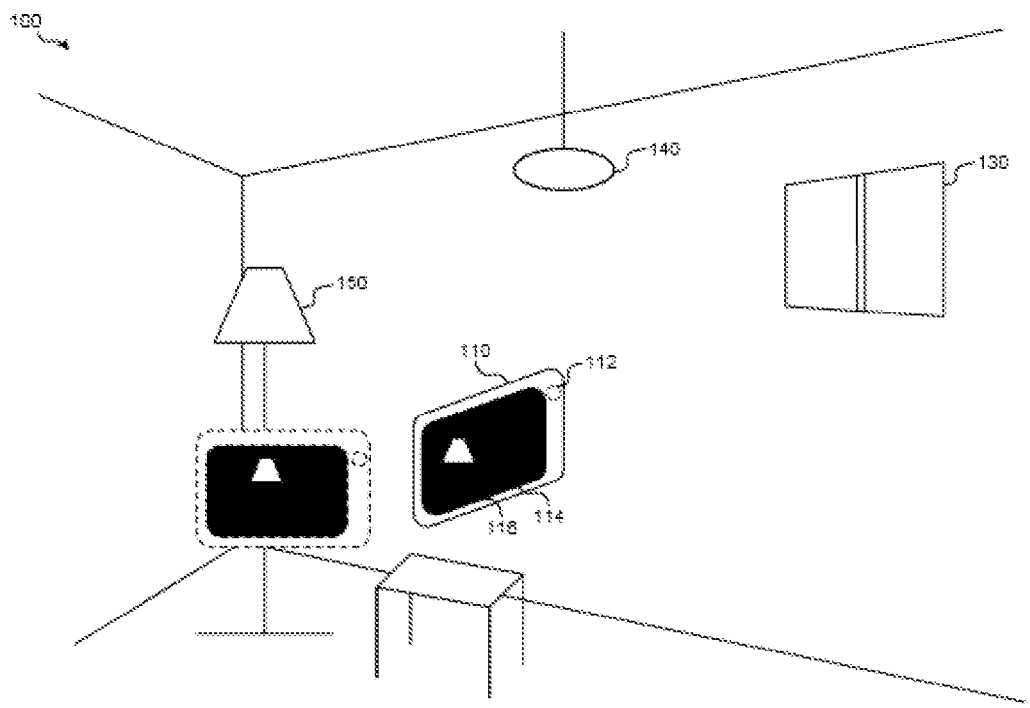
FIG. 2 schematically illustrates an embodiment of detection and/or estimation of a light source for implementing an extended reality session.
Figure 3:
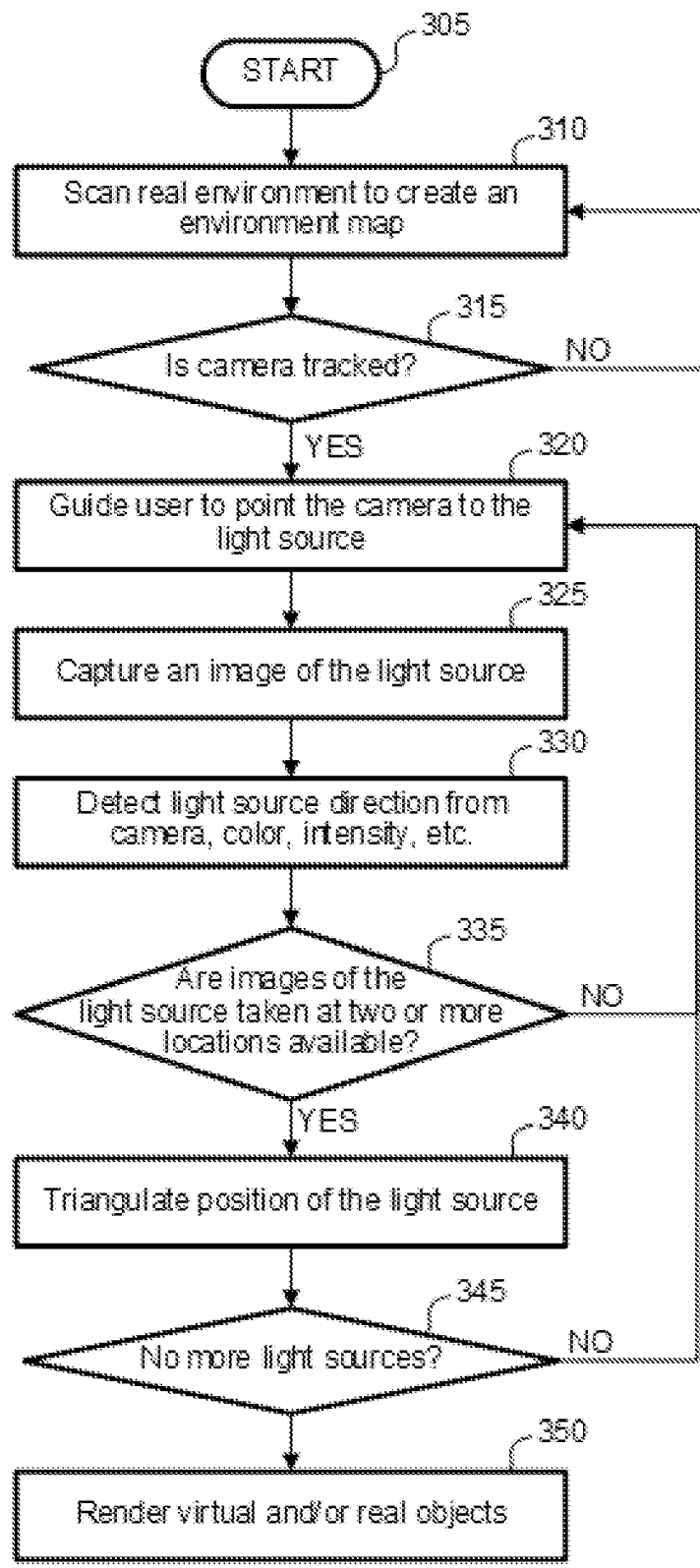
FIG. 3 is a flow chart illustrating an embodiment the functionality of detecting and/or estimating light sources for implementing an extended reality session.

FIG. 2 schematically illustrates the detection and/or estimation of a light source using the electronic device 110 for implementing an extended reality session. FIG. 3 is a flow chart illustrating the functionality of light source detection and/or estimation implemented by the electronic device 110, which will be discussed below in conjunction with FIG. 2. The functionality of the various blocks within the flow chart may be executed by hardware and/or software components of the electronic device 110. It is noted that alternative embodiments may alter the functionality illustrated to add, remove, combine, separate, and/or rearrange the various functions shown. A person of ordinary skill in the art will appreciate such variations.

Initially, at block 305, to implement an extended reality session, in some embodiments, an AR and/or MR application that may be stored in a memory of the electronic device 110 may be activated to start the extended reality session. At block 310, the electronic device 110, via the application, may guide the user of the electronic device 110 to scan the surrounding environment, such as environment 100, in which the extended reality session may be conducted. The environment 100 may be scanned using the camera 112 of the electronic device 110 so as to create an environment map or a global coordinate frame of the real environment 100. Other sensor inputs, such as inputs received from lidar, radar, sonar, or various other sensors of the electronic device 110, if available, may also be utilized, when creating the environment map. The environment map may be continuously updated as new inputs may be received from the various sensors of the electronic device 110.

The environment map may be a 3D map that can be used to keep track of the pose of camera 112, e.g., the position and the orientation of the camera 112, as the user moves the electronic device 110 in the environment 100. The position may represent or may be indicative of where the camera 112 is and the orientation may represent or may be indicative of the direction in which the camera 112 is pointed or directed. The camera 112 may be moved with three degrees of freedom, resulting in a change in its position, and may be rotated with three degrees of freedom, leading to a change in its orientation.

Construction of the environment map of the real environment 100 and/or tracking of the position and orientation of the camera 112 may be performed using Simultaneous Localization and Mapping (SLAM) or any other suitable techniques for constructing and/or updating a map of an unknown environment while simultaneously keeping track of the position and orientation of an moving object, such as the camera 112 of the electronic device 110 described herein, in the environment 100. Examples of SLAM systems or modules that may be implemented on the electronic device 110 may include ARKit from Apple, ARCore from Google, AREngine from HUAWEI, ARUnit from OPPO, and the like. The SLAM module may be configured to cause the electronic device 110 to provide information, e.g., via a display and/or speaker of the electronic device 110, to guide a user to scan the environment 100 in a manner that may facilitate the mapping and/or tracking process.

At block 315, the electronic device 110, via the application, may continue to guide the user to scan or map the environment 100 at block 310 until the environment map is established and the position and orientation of the camera 112 in the environment map is tracked by the SLAM module. Once the environment map is established and the position and orientation of the camera 112 is tracked, the application may proceed to the subsequent blocks. It is noted that although an environment map may be established using the SLAM module, the locations of the various light sources in the real environment 100 may not be mapped into the environment map using the SLAM module alone. This is because the SLAM module typically operates by visually detecting well-defined natural features, such as points, edges, surfaces, etc., in the real environment 100. When input from an image sensor, e.g., camera 112, is used, the captured image may not provide well-defined features for the SLAM module to detect the light sources correctly due to saturation, glare, etc. Thus, in some embodiments, techniques to reduce saturation, glare, etc. may be implemented. In some embodiments, other sensor inputs, in addition to the image sensor input, may be used to facilitate the detection and/or estimation of the position of a light source, as will be discussed in more detail below.

At block 320, the electronic device 110, via the application, may guide the user to point the camera 112 to a light source in the real environment 100, such as the floor lamp 150 shown in FIG. 2. As already mentioned above, the floor lamp 150 may also be referred to as a real-world light source or a real light source, in contrast to a virtual light source which may be implemented during an extended reality session using computer rendering techniques. Unless specified otherwise, the light source the various embodiments configured to detect refers to real, photon-emitting light sources, which may include natural light sources, such as sunlight, moonlight, etc., artificial or man-made light sources, such as electrical lights, solar lights, candles, and/or any other photon-emitting light sources.

To guide the user to point the camera 112 to a light source, e.g., the floor lamp 150, a visual or audio cue may be provided to the user in some embodiments. For example, a text message may be displayed on the display 114 of the electronic device 110, asking the user to point the camera 112 to the light source. In some embodiments, the message provided to the user may further include information specifying possible types of light sources for the user to look for as sometimes the user may overlook certain light sources, such as light coming from the window 130. The message provided to the user may further include information specifying what may not be a light source, such as a light that is not turned on. Similar information may be provided to the user as audio cues using an audio output device, e.g., speaker, of the electronic device 110.

In some embodiments, the electronic device 110, via the application, may guide the user by pointing out a general direction for the user to move the camera 112 or the electronic device 110 so as to point the camera 112 toward a light source. The application may determine a general direction of a light source by analyzing the light intensity of the image the camera 112 is currently capturing. For example, the electronic device 110 may compute a brightness or intensity gradient of the currently captured image, and based on the brightness gradient determine a general direction the user may move the camera 112 so as to point the camera 112 toward the light source. For example, the computed brightness gradient may suggest that a top side of the currently captured image is brighter, indicating that a light source may likely be above where the camera 112 is currently pointing. An arrow on the display or other visual or audio cues may be provided to the user to guide the user to move up the electronic device 110 so as to point the camera 112 toward the light source.

In some embodiments, once the position and orientation of the camera 112 have been tracked using the SLAM module, another scan of the real environment 100 may be performed after block 315 and prior to block 320 in a manner similar to how the scan for creating the environment map may be performed. This scan may be referred to as a pre-estimation scan. During this pre-estimation scan, the camera 112 may be configured to automatically adjust its exposure settings to accommodate the light intensity variation in the real environment 100. Thus, during the pre-estimation scan, the electronic device 110 may track the position and orientation of the camera 112 each time an automatic exposure adjustment is performed. For example, in some embodiments, the electronic device 110 may track the position and orientation of the camera 112 when a decrease in the exposure is performed as the decrease in exposure is likely due to a presence of a light source. Thus, by tracking the instances of decreased exposure, the electronic device 110 may perform a preliminary estimation of all possible light sources in the environment 100. Subsequently at block 320, the electronic device 110 may guide the user to move the camera 112 to the same position and orientation where a decrease in the exposure was performed previously to point the camera 112 at a light source.

At block 325, as the camera 112 is pointed at the light source, the camera 112 may capture an image, e.g., a 2D image, of the light source. To mitigate the saturation effects due to imagining the light source directly, the exposure may be decreased so as to reduce the amount of light captured by the sensor of the camera 112. Thus, the surroundings of the light source in the captured 2D image may be dark, such as shown in the 2D image 116 of the floor lamp 150 in FIG. 2. In some embodiments, the exposure may be adjusted, in particular, reduced by third-stops, half-stops, one stop, two stops, three stops, etc., such that an image of the light source may be obtained. Deceasing (or increasing) the exposure by one stop results in a halving (or a doubling) of the amount of light let into the camera 112. Although exposure stops are described as examples of amount of exposure adjustment (e.g., exposure reduction), the exposure may be adjusted in lesser or greater increment, and/or the exposure may be adjusted in a gradual or continuous manner. Reduced exposure may be achieved by decreasing the shutter speed, decreasing the exposure time, and/or decreasing the sensitivity of the sensor of the camera 112.

In some embodiments, the camera 112 may be configured to automatically adjust the exposure setting to a first level such that an image captured with the first level of exposure may have an overall tone of 18% gray. To capture an image of the light source with sufficient details for subsequently analysis, the exposure may be further reduced to a second exposure level below the automatically adjusted first exposure level. For example, the second exposure level may be third-stops, half-stops, one stop, two stops, three stops, etc., below the first exposure level. Once the exposure is reduced to the second level, an image of the light source may be capture for subsequent analysis.

In some embodiments, the camera 112 may not be configured to automatically adjust the exposure setting to obtain an overall 18% gray tone. Thus, the camera 112 may be configured to measure an amount of the light coming from the light source and the surrounding environment. Based on the measured amount, the camera 112 may determine a first level of exposure to obtain an overall 18% gray tone. The camera 112 may then determine a second level of exposure below the first level of exposure for taking an image of the light source.

In some embodiments, in order to obtain an image of the light source that may be of sufficient quality, e.g., with well-defined details of the light source captured in the image for subsequent analysis, as the exposure is gradually reduced, multiple images may be captured at different exposures. Image analysis may be performed to compare each image with the immediately preceding image to determine if additional features, in particular line features, are captured or shown in the subsequent image. Thus, although the initial exposure may not be sufficient, resulting in a bright area that is greater than the light source to be shown in the captured image, further reduced exposure may be sufficient, capturing an image properly showing the details of the light source, such as the contour, shape, etc., of the light source. The electronic device 110 and/or the camera 112 may be configured to continuously capture images of the light source as the exposure is gradually reduced until a comparison between an image and the immediately preceding image may suggest no new features, such as no new line features may be captured. When no new features, such as no new line features may be captured, the electronic device 110 may determine that an image of the light source with sufficient quality or sufficient details of the light source has been captured for subsequent analysis. Although capturing and comparing multiple images are described herein as an example, the electronic device 110 may be configured to continuously process the video captured by the camera 112 until no new line features may be captured and/or detected. When no new line features may be captured and/or detected in the video, the camera 112 may capture one image of the electronic device 110 for subsequent analysis.

When capturing the image or images of the light source, exposure may be reduced only temporarily or for a limited amount of time so as not to interrupt the continuous tracking of the position and orientation of the camera 112 by the SLAM module. As discussed above, the SLAM module may depend on tracking, based on image input, natural features in the environment 100. Reduced exposure may affect the tracking functionality of the SLAM module as the natural features may not be shown in the images due to the reduced exposure, deteriorating imaging quality, and/or lighting condition when capturing the image of the light source. In some embodiments, to allow the SLAM module to keep tracking the position and orientation of the camera 112 even when the image input may not be available, the position and orientation of the camera 112 may be tracked using inertial odometry for a short period of time. For example, the electronic device 110 or the SLAM module may include an inertial measurement unit (IMU). The IMU may be configured to measure and/or track the change in the position and/or orientation of the camera 112 using a combination of accelerometers, gyroscopes, magnetometers, and the like. Thus, when the image input for the SLAM module may deteriorate and/or become unavailable, the SLAM module may be configured to use inputs from the IMU for keeping track of the position and orientation of the camera 112. Depending on the period of time for which the IMU is capable of continuously tracking the position and orientation of the camera 112, the reduced exposure may be maintained no greater than that period. In some embodiments, the reduced exposure may be maintained no greater than 10 seconds, no greater than 5 seconds, no greater than 3 seconds, no greater than 1 second, no greater than 0.5 seconds, no greater than 0.1 seconds, or less.

In some embodiments, reducing exposure may be carried out in two stages. For example, when the user is initially guided to move the camera 112 toward the light source, the exposure may be reduced by a first amount to allow the user to be able to see the light source through the camera 112 on the display of the electronic device 110. When camera 112 is pointed at the light source, the exposure may be further reduced by a second amount such that an image of the light source may be captured showing the contour or other features of the light source for subsequent processing to determine the size, shape, location, intensity, color, etc., of the light source. By reducing the exposure in two stages, the SLAM module may still be able to receive sufficient image input for tracking the position and orientation of the camera 112 when the exposed is reduced by the first amount, reducing the total time that the image input may not be available for the SLAM module. In some embodiments, the first amount and/or the second amount exposure reduction may be predetermined amounts.

At block 330, once an image of the light source may be captured, the image may be processed to determine one or more characteristics of the light source, e.g., position, color, intensity, shape, size, etc., of the light source. For example, thresholding, blob detection, contour tracing, and the like may be performed to determine the contour, shape, size, etc., of the light source, and such information may be subsequently utilized for rendering. The color of the light source may be analyzed based on the inputs from the camera sensor. The color and intensity of the light source may also be analyzed based on the image, other data received from the image sensor of the camera 112, and/or the exposure adjustment made when capturing the image. In some embodiments, the camera 112 may be calibrated for color analysis. For example, one or more reference light sources may be used for calibrating the camera 112 such that through calibration, correspondence between the color in the real world and the color in the image captured can be established. Utilizing such correspondence, when images of other light sources are captured, the colors of the light sources may be determined based on the captured images. Similarly, the camera 112 may also be calibrated for intensity analysis to establish a correspondence between intensity levels and captured images. Thus, when images of other light sources are captured, the intensity of the light sources may be determined based on the captured images and the correspondence.

In some embodiments, the image may be analyzed to determine the type of the light source, e.g., whether the light source is an area light source, a linear light source, a point light source, etc. In some embodiments, the size of the light source may be calculated and compared to a threshold value. If the size of the light source is smaller than the threshold value, the light source is then likely to be a point light source. If the size of the light source is greater than the threshold value, the light source is then likely to be an area light source. In some embodiments, one or more cross dimension, aspect ratios, or other dimensions may also be measured and/or compared to threshold values to determine whether the light source may be an area light source, a linear light source, or a point light source. Various other image analysis techniques may be implemented to determine whether the light source is an area light source, a linear light source, a point light source, etc.

In some embodiments, the image may be further processed to determine a direction of the light source. As discussed above, the position and orientation of the camera 112 may be continuously tracked using the SLAM module and/or the IMU. Thus, the position and orientation of the camera 112 in the environment map at the time of capturing the image of the light source is known. Image analysis may be performed to determine a center of the light source, such as in the case of a point light source, in the captured image. Based on the position and orientation of the camera 112 in the environment map and the position of the center of the light source in the captured image, a vector in the environment map indicating a direction from the camera 112, e.g., camera center, to the light source, e.g., the center of the light source, at the moment the image was captured can be computed. The direction from the camera 112 to the light source can be used in subsequent analysis for determining the location of the light source in the environment map. In some embodiments, the light source may be an area light source, thus, instead of or in addition to determining the position of the center of the light source, the external contour of the light source may be traced using image processing, and the direction from the camera 112, e.g., the camera center, to each point or select points at predetermined intervals along the contour of the light source may be computed.

In some embodiments, an illuminating path of the light source may also be determined. As mentioned above, multiple images of the light source may be taken with gradually reduced exposure. By comparing the brightness variation among the multiple images, bright areas that may be shown in an image captured at a higher exposure setting may not be shown in an image captured at a lower exposure setting. Based on the change in the bright area captured in the multiple images, an illuminating path of the light source may be determined. Such information may be used in subsequent rendering.

At block 335, the electronic device 110 may determine whether two or more images of the light source have been take when the camera 112 were at two or more different locations in the environment 100. The locations at which the images have been taken may be obtained based on the position of the camera 112 that has been tracked using the SLAM module and/or the IMU. If the electronic device 110 determines that the image or images of the light source have been taken only from a single location, then the electronic device 110 may implement the functionality of block 320 to guide the user to point the camera 112 to the light source from a different location, such as the location of the electronic device 110 shown in dahs line in FIG. 2. For example, visual or audio cues may be provided to the user to rotate the camera 112 or move to a different location and point the camera 112 at the light source. At block 325, the electronic device 110 may capture an image from the new location, and at block 330, may determine the direction from the camera 112 to the light source direction, color, intensity, size, shape, illuminating path, etc.

Once the electronic device 110 determines that images of the light source have been taken at two or more locations at block 335, triangulation may be performed at block 340 to compute the position of the light source within the environment map established by the SLAM module. As discussed, by continuously tracking the position and orientation of the camera 112 when the images of the light source were taken at different locations, the direction from the different camera 112 locations to the light source can be computed. Based on the directions from the different camera locations to the light source, and the corresponding positions of the camera 112, 3D triangulation may be performed to determine the 3D position of the light source in the environment map. For a point light source, the position of the center of the light source may be computed as the position of the light source. For an area light source, corresponding points along the contour of the light source can be triangulated to compute 3D positions of the contour of the area light source. Based on the position of the light source in the environment map and the various characteristics determined earlier, a more realistic and accurate rendering of the interaction between the light source and the real and/or virtual objects may be achieved.

At block 345, the electronic device 110, via the application, may determine if all the light sources have been detected and analyzed. In some embodiments, the electronic device 110 may provide a prompt, e.g., visual and/or audio prompt, to the user asking the user if all light sources have been detected. If the user input, e.g., a voice command, button click, gesture, etc. indicates yes, then the electronic device 110 may concluded the light source detection process. If the user input indicates no, then the functionality of blocks 320 to 345 may be repeated until all light sources have been detected and analyzed.

As discussed above, the electronic device 110 may track all the positions and orientations of the camera 112 where an automatic exposure decrease was performed during a pre-estimation scan of the environment 100 to perform a preliminary estimation of all possible light sources in the environment 100. That preliminary estimation of all possible light sources may also be used at block 345 for the electronic device 110 to determine if all light sources have been detected and analyzed, without requiring user input.

Once all the light sources have been detected and analyzed, the electronic device 110 may proceed to block 350 to implement the extended reality session. In some embodiments, when implementing the extended reality session, the electronic device 110 may capture an image and/or video of the environment 100. One or more support surfaces, e.g., the table top shown in FIGS. 1 and 2, may be detected by a surface detection algorithm. The user can place one or more virtual objects, e.g., virtual object 160 shown in FIG. 1, onto the support surface. One or more virtual objects may also be placed in the environment 100 automatically by the electronic device 110. Rendering of the virtual objects and/or real objects may be performed, utilizing the position, color, intensity, size, shape, and various other information of the various light source estimated in the preceding blocks.

In some embodiments, rendering may be done by using a ray tracing. In some embodiments, primary rays may be casted from the camera through each pixel on the imaging plane. When a primary ray first intersects with virtual geometry or reconstructed real geometry, secondary rays may be recursively casted from the intersection point. Secondary rays may include shadow rays. A shadow ray may be casted toward each of the estimated light sources. If the shadow ray is blocked by other opaque objects, the light source may not illuminate the surface. This way, shadow mapping may be implemented. In some embodiments, single ray approximation can be replaced with a distribution of rays (DST) to render soft shadow effects using area light source instead of point light source. In some embodiments, raster graphics may be used instead of ray tracing. With the various information about the light sources that have been detected and analyzed using the embodiments described herein, the effect of the interaction between the virtual objects, the real objects, and the light from the various light source may be simulated in a more accurate and realistic manner.

In addition to improved rendering quality, the embodiments described herein also enable light source detection and/or estimation for extended reality applications without using additional hardware. As mentioned earlier, existing approaches rely on using a fisheye camera or manual input from the user regarding the properties of the light source. The present disclosure/technology can detect and/or estimate the various properties of the light sources without requiring a separate, fisheye camera or manual specification of the light sources by the user. The camera for implementing the various embodiments may be a camera of any type, and may include rectilinear camera, wide angle camera, fisheye camera, or any types of image capturing devices. Because the embodiments described herein may utilize the same camera for implementing the extended reality session and for automatically detecting and/or estimating the various properties of the light sources, there is no need to coordinate the positions of the two cameras as required in the existing technologies. The various embodiments may be implemented on any mobile products, including but not limited to handheld devices, such as smart phones or tablets, hands-free devices, wearable devices, such as head-mounted displays (HMD), optical see-through head-mounted displays (OST HMDs), or smart glasses, or any devices that may be capable of implementing an AR, MR, or other extended reality applications.

Figure 4:
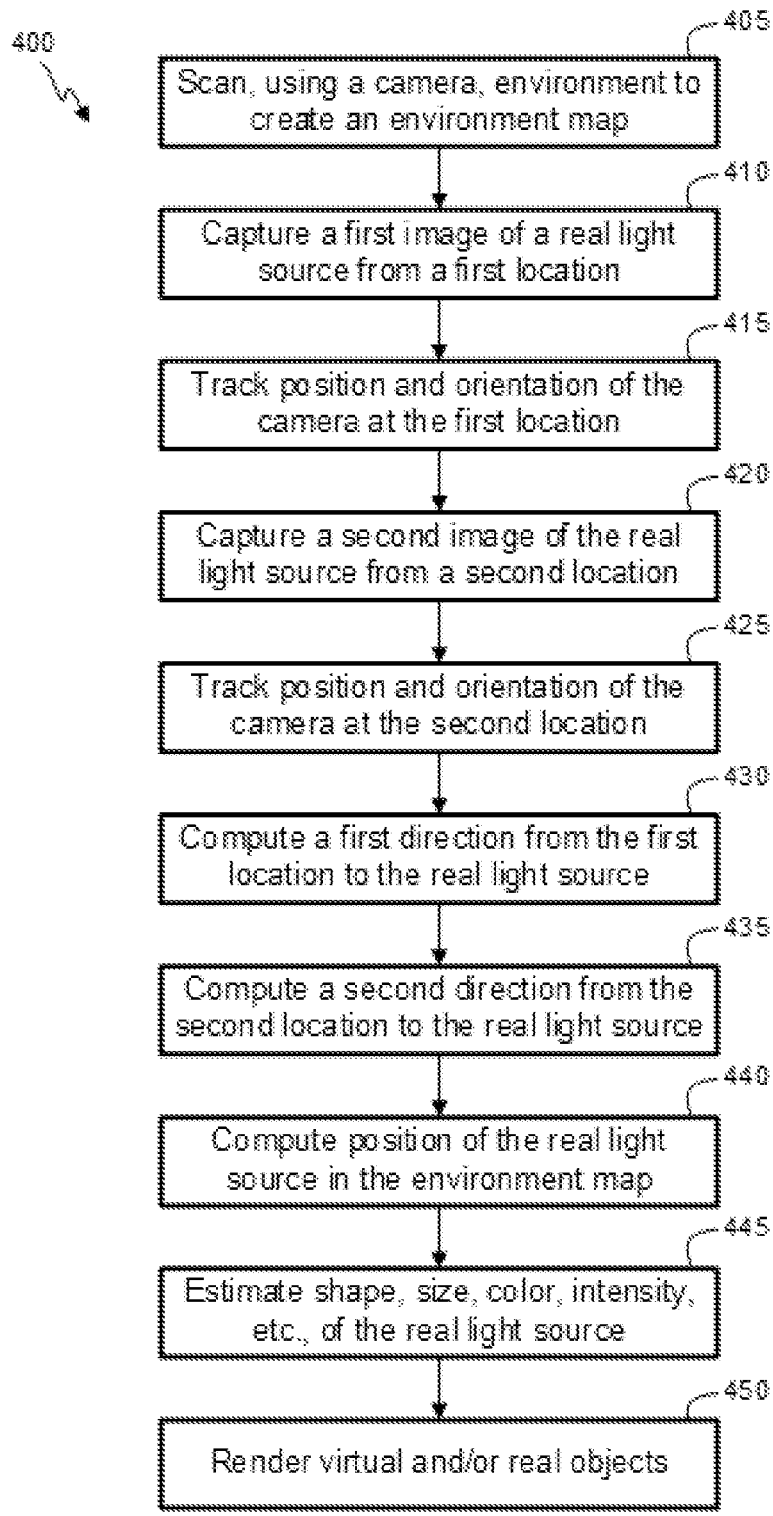
FIG. 4 is a flow diagram illustrating an embodiment of a method of detecting and/or estimating light sources for implementing an extended reality session.

FIG. 4 is a flow diagram illustrating a method 400 of detecting and/or estimating light sources. The method 400 can be implemented by the electronic device 110 as described herein, for example. As such, means for performing one or more of the functions illustrated in the various blocks of FIG. 4 may comprise hardware and/or software components of the electronic device 110. As with other figures herein, FIG. 4 is provided as an example. Other embodiments may vary in functionality from the functionality shown. Variations may include performing additional functions, substituting and/or removing select functions, performing functions in a different order or simultaneously, and the like.

At block 405, the method 400 may include scanning, using a camera, such as the camera 112 of the electronic device, a real environment to establish an environment map of the real environment. The environment map may be created using a SLAM module that may be implemented by the electronic device as discussed above. Once the environment map has been established, the position and orientation of the camera may also be tracked using the SLAM module and the environment map.

At block 410, the method 400 may include capturing, using the camera, a first image of a real light source, such as a natural light source or man-made light source discussed above, from a first location in the environment. The captured image may be used for sequent analysis to determine the position, size, shape, color, intensity, and various other characteristics of the light source. To reduce the saturation, glare, etc., due to direct imaging of the light source, various techniques may be implemented, including reducing exposure, as discussed above. Reducing the exposure may be achieved by decreasing the shutter speed, decreasing the exposure time, and/or decreasing the sensitivity of the sensor of the camera.

At block 415, the method 400 may include tracking a first position and a first orientation of the camera while capturing the first image. The first position and the first orientation may be tracked using a sensor unit, such as an inertial measurement unit (IMU), in addition or alternative to the SLAM module. As discussed above, the SLAM module may rely on image input to track the position and orientation of the camera. Reduced exposure may affect the SLAM module's ability to track the position and orientation while the first image is captured. Thus, the first position and the first orientation of the camera in the environment map may be tracked using the IMU while capturing the first image of the real light source. Reducing the exposure in multiple stages may also ensure continued tracking of the position and orientation of the camera as discussed above.

At block 420, the method 400 may include capturing, using the camera, a second image of the real light source from a second location in the environment that is different from the first location. Again, to reduce the saturation, glare, etc., the exposure may be reduced.

At block 425, the method 400 may include tracking a second position and a second orientation of the camera while capturing the second image. The second position and the second orientation may be tracked in a manner the same as or similar to how the first position and the first orientation may be tracked, such as using the IMU, in addition or alternative to the SLAM module. In some embodiments, the method 400 may further include continuously tracking the position and the orientation of the camera in the environment map using the SLAM module while the camera is moved from the first location to the second location.

At block 430, the method 400 may include computing, using one or more processors of the electronic device, a first direction in the environment map that corresponds to a direction from the camera at the first location to the real light source. The first direction may be computed based at least in part on the first orientation of the camera or the first image. For example, image analysis may be performed to determine a center of the light source in the first image, such as in the case of a point light source. Based on the first position and/or the first orientation of the camera in the environment map and the position of the center of the light source in the first image, a vector in the environment map indicating the first direction from the camera center to the light source center at the moment the first image was captured can be computed. In the case of an area light source, instead of or in addition to determining the position of the center of the light source, the external contour of the light source may be traced using image processing. Directions from the camera to all points or select points at predetermined intervals along the contour of the light source may be computed.

At block 435, the method 400 may include computing, using the one or more processors of the electronic device, a second direction in the environment map that corresponds to a direction from the camera at the second location to the real light source. The second direction may be computed based at least in part the second orientation of the camera or the second image, similar to how the first direction may be calculated.

At block 440, the method 400 may include computing the position of the real light source in the environment map. In some embodiments, the position of the real light source may be computed based on the first and second directions from the camera to the real light source, and based on the first and second positions of the camera, using, e.g., triangulation.

At block 445, the method 400 may further include estimating the shape, size, color, intensity, and/or various characteristics of the light source as discussed above. The operations performed from blocks 410 to 445 may be repeated for each light source in the real environment until all light sources have been detected and analyzed. Various techniques discussed above, such as receiving user inputs and/or implementing pre-estimation scanning, may be utilized to determine whether all light sources have been detected and analyzed.

At block 450, the method 400 may include rendering virtual and/or real objects for implementing an extended reality session. In some embodiments, the method 400 may include capturing, using the camera, an image or video of the real environment. The method 400 may further include overlaying one or more virtual and/or real objects in the image of the real environment. The method 400 may further include simulating an effect of an interaction between the virtual and/or real objects and the real light sources based at least in part on the detected position of the real light source. The size, shape, color, intensity, and/or various other characteristics of the light sources may also be considered. The effect of the interaction between the virtual and/or real objects and the light from the real light sources may be implemented via ray tracing, rasterization, and/or various other rending techniques.

Figure 5:
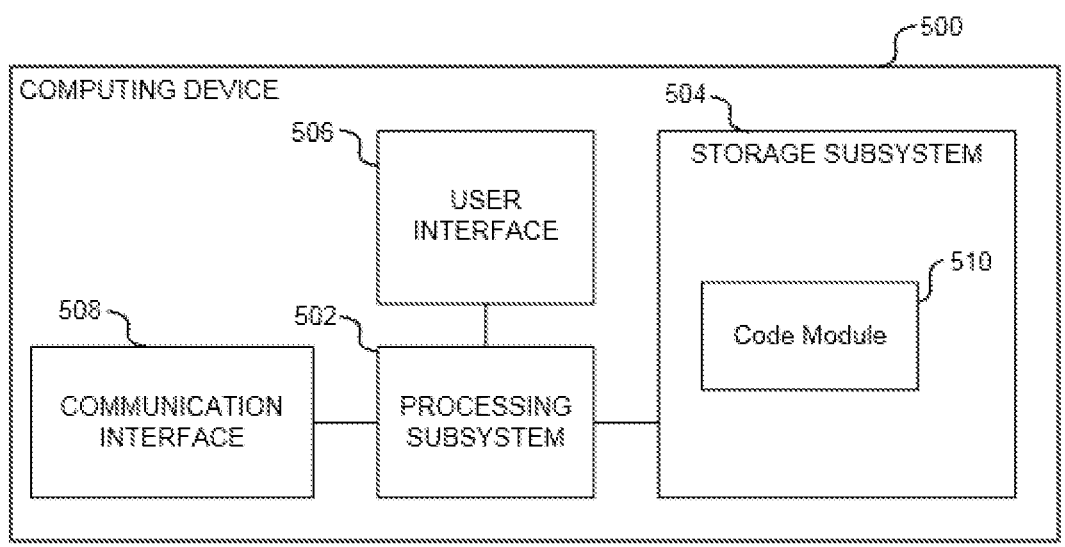
FIG. 5 depicts a block diagram of an embodiment of a computer system.

FIG. 5 is a simplified block diagram of a computing device 500. Computing device 500 can implement some or all functions, behaviors, and/or capabilities described above that would use electronic storage or processing, as well as other functions, behaviors, or capabilities not expressly described. Computing device 500 includes a processing subsystem 502, a storage subsystem 504, a user interface 506, and/or a communication interface 508. Computing device 500 can also include other components (not explicitly shown) such as a battery, power controllers, and other components operable to provide various enhanced capabilities. In various embodiments, computing device 500 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 504 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 504 can store one or more applications and/or operating system programs to be executed by processing subsystem 502, including programs to implement some or all operations described above that would be performed using a computer. For example, storage subsystem 504 can store one or more code modules 510 for implementing one or more method steps described above.

A firmware and/or software implementation may be implemented with modules (e.g., procedures, functions, and so on). A machine-readable medium tangibly embodying instructions may be used in implementing methodologies described herein. Code modules 510 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 510) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 510 may comprise sets of instructions (codes) embodied on a computer-readable medium that directs a processor of a computing device 500 to perform corresponding actions. The instructions may be configured to run in sequential order, in parallel (such as under different processing threads), or in a combination thereof. After loading a code module 510 on a general purpose computer system, the general purpose computer is transformed into a special purpose computer system.

Computer programs incorporating various features described herein (e.g., in one or more code modules 510) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 504 can also store information useful for establishing network connections using the communication interface 508.

User interface 506 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 506 to invoke the functionality of computing device 500 and can view and/or hear output from computing device 500 via output devices of user interface 506. For some embodiments, the user interface 506 might not be present (e.g., for a process using an ASIC).

Processing subsystem 502 can be implemented as one or more processors (e.g., integrated circuits, one or more single core or multi core microprocessors, microcontrollers, central processing unit, graphics processing unit, etc.). In operation, processing subsystem 502 can control the operation of computing device 500. In some embodiments, processing subsystem 502 can execute a variety of programs in response to program code and can maintain multiple concurrently executing programs or processes. At a given time, some or all of a program code to be executed can reside in processing subsystem 502 and/or in storage media, such as storage subsystem 504. Through programming, processing subsystem 502 can provide various functionality for computing device 500. Processing subsystem 502 can also execute other programs to control other functions of computing device 500, including programs that may be stored in storage subsystem 504.

Communication interface 508 can provide voice and/or data communication capability for computing device 500. In some embodiments, communication interface 508 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 508 can provide wired connectivity (e.g., universal serial bus, Ethernet, universal asynchronous receiver/transmitter, etc.) in addition to, or in lieu of, a wireless interface. Communication interface 508 can be implemented using a combination of hardware (e.g., driver circuits, antennas, modulators/demodulators, encoders/decoders, and other analog and/or digital signal processing circuits) and software components. In some embodiments, communication interface 508 can support multiple communication channels concurrently. In some embodiments the communication interface 508 is not used.

It will be appreciated that computing device 500 is illustrative and that variations and modifications are possible. A computing device can have various functionality not specifically described (e.g., voice communication via cellular telephone networks) and can include components appropriate to such functionality.

Further, while the computing device 500 is described with reference to particular blocks, it is to be understood that these blocks are defined for convenience of description and are not intended to imply a particular physical arrangement of component parts. For example, the processing subsystem 502, the storage subsystem, the user interface 506, and/or the communication interface 508 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 500.

Various features described herein, e.g., methods, apparatus, computer readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

What is claimed is:

1. A method of detecting a light source for implementing an extended reality session using an electronic device having a camera and a sensor unit, the method comprising:
    scanning, using the camera, a real environment to establish an environment map of the real environment;
    capturing, using the camera, a first image of a real light source from a first location in the real environment;
    tracking, using the sensor unit, a first position and a first orientation of the camera in the environment map while the first image is captured;
    capturing, using the camera, a second image of the real light source from a second location in the real environment that is different from the first location;
    tracking, using the sensor unit, a second position and a second orientation of the camera in the environment map while the second image is captured; and
    computing, by one or more processors of the electronic device, a position of the real light source in the environment map based on the first position, the first orientation, the second position, and the second orientation of the camera,
    wherein capturing the first image of the real light source comprises:
        reducing an exposure setting of the camera to a first exposure level;
        capturing, using the camera, a third image of the real light source at the first exposure level;
        reducing the exposure setting of the camera to a second exposure level that is below the first exposure level, wherein the first image of the real light source is captured at the second exposure level; and
        using the first image for subsequent analysis of the real light source, wherein the first image captures no more line features than the third image.

2. The method of claim 1, wherein:
    the sensor unit comprises an inertial measurement unit;
    the first position and the first orientation of the camera in the environment map is tracked using the IMU while capturing the first image of the real light source; and
    the second position and the second orientation of the camera in the environment map is tracked using the IMU while capturing the second image of the real light source.

3. The method of claim 1, wherein the electronic device comprises a mobile device, the method further comprising:
    continuously tracking a third position and a third orientation of the camera in the environment map using a SLAM module of the electronic device while the camera moves from the first location to the second location.

4. The method of claim 1, wherein computing the position of the real light source in the environment map comprises:
computing, by the one or more processors of the electronic device, a first direction in the environment map that corresponds to a direction from the camera at the first location to the real light source, wherein the first direction is computed based at least in part on the first orientation of the camera or the first image; and
computing, by the one or more processors of the electronic device, a second direction in the environment map that corresponds to a direction from the camera at the second location to the real light source, wherein the second direction is computed based at least in part the second orientation of the camera or the second image.

5. The method of claim 1, further comprising:
capturing, using the camera, a first image of the real environment;
overlaying a virtual object in the first image of the real environment; and
simulating, via ray tracing, an effect of an interaction between the virtual object and the real light source based at least in part on the detected position of the real light source.

6. The method of claim 1, wherein the camera comprises a rectilinear lens.

7. An electronic device for detecting a light source for implementing an extended reality session, the electronic device comprising:
a camera;
a sensor unit;
one or more processors; and
a memory having instructions that, when executed by the one or more processors, cause the electronic device to perform the following operations:
establishing an environment map of a real environment based on information received from the camera;
capturing, using the camera, a first image of a real light source from a first location in the real environment;
tracking, using the sensor unit, a first position and a first orientation of the camera in the environment map while the first image is captured;
capturing, using the camera, a second image of the real light source from a second location in the real environment that is different from the first location;
tracking, using the sensor unit, a second position and a second orientation of the camera in the environment map while the second image is captured; and
computing, using the one or more processors, a position of the real light source in the environment map based on the first position, the first orientation, the second position, and the second orientation of the camera,
wherein capturing the first image of the real light source comprises:
reducing an exposure setting of the camera to a first exposure level;
capturing, using the camera, a third image of the real light source at the first exposure level;
reducing the exposure setting of the camera to a second exposure level that is below the first exposure level, wherein the first image of the real light source is captured at the second exposure level; and using the first image for subsequent analysis of the real light source, wherein the first image captures no more line features than the third image.

8. The electronic device of claim 7, wherein:
the sensor unit comprises an inertial measurement unit (IMU);
the first position and the first orientation of the camera in the environment map is tracked using the IMU while capturing the first image of the real light source; and
the second position and the second orientation of the camera in the environment map is tracked using the IMU while capturing the second image of the real light source.

9. The electronic device of claim 7, wherein the electronic device comprises a mobile device, and wherein the instructions, when executed by the one or more processors, further cause the electronic device to perform the following operation:
continuously tracking a third position and a third orientation of the camera in the environment map using a SLAM module of the electronic device while the camera moves from the first location to the second location.

10. The electronic device of claim 7, wherein computing the position of the real light source in the environment map comprises:
computing a first direction in the environment map that corresponds to a direction from the camera at the first location to the real light source, wherein the first direction is computed based at least in part on the first orientation of the camera or the first image; and
computing a second direction in the environment map that corresponds to a direction from the camera at the second location to the real light source, wherein the second direction is computed based at least in part on the second orientation of the camera or the second image.

11. The electronic device of claim 7, wherein the instructions, when executed by the one or more processors, further causes the electronic device to perform the following operations:
capturing, using the camera, a first image of the real environment;
overlaying a virtual object in the first image of the real environment; and
simulating, via ray tracing, an effect of an interaction between the virtual object and the real light source based at least in part on the detected position of the real light source.

12. The electronic device of claim 7, wherein the camera comprises a rectilinear lens.

13. A non-transitory machine-readable medium having instructions for detecting a light source for implementing an extended reality session using an electronic device having a camera and a sensor unit, wherein the instructions are executable by one or more processors to cause the electronic device to perform the following operations:
scanning, using the camera, a real environment to establish an environment map of the real environment;
capturing, using the camera, a first image of a real light source from a first location in the real environment;
tracking, using the sensor unit, a first position and a first orientation of the camera in the environment map while the first image is captured;
capturing, using the camera, a second image of the real light source from a second location in the real environment that is different from the first location;

tracking, using the sensor unit, a second position and a second orientation of the camera in the environment map while the second image is captured; and computing, using the processor, a position of the real light source in the environment map based on the first position, the first orientation, the second position, and the second orientation of the camera, wherein capturing the first image of the real light source comprises:
- reducing an exposure setting of the camera to a first exposure level;
- capturing, using the camera, a third image of the real light source at the first exposure level;
- reducing the exposure setting of the camera to a second exposure level that is below the first exposure level, wherein the first image of the real light source is captured at the second exposure level; and
- using the first image for subsequent analysis of the real light source, wherein the first image captures no more line features than the third image.

14. The non-transitory machine-readable medium of claim 13, wherein:
- the sensor unit comprises an inertial measurement unit (IMU);
- the first position and the first orientation of the camera in the environment map is tracked using the IMU while capturing the first image of the real light source; and
- the second position and the second orientation of the camera in the environment map is tracked using the IMU while capturing the second image of the real light source.

15. The non-transitory machine-readable medium of claim 13, wherein the electronic device is a mobile device, and wherein the instructions are executable by the one or more processors to further cause the electronic device to perform the following operation:
- continuously tracking a third position and a third orientation of the camera in the environment map using a SLAM module of the electronic device while the camera moves from the first location to the second location.

16. The non-transitory machine-readable medium of claim 13, wherein computing the position of the real light source in the environment map comprises:
- computing a first direction in the environment map that corresponds to a direction from the camera at the first location to the real light source, wherein the first direction is computed based at least in part on the first orientation of the camera or the first image; and
- computing a second direction in the environment map that corresponds to a direction from the camera at the second location to the real light source, wherein the second direction is computed based at least in part on the second orientation of the camera or the second image.

17. The non-transitory machine-readable medium of claim 13, the instructions are executable by the one or more processors to further cause the electronic device to perform the following operations:
- capturing, using the camera, a first image of the real environment;
- overlaying a virtual object in the first image of the real environment; and
- simulating, via ray tracing, an effect of an interaction between the virtual object and the real light source based at least in part on the detected position of the real light source.

\* \* \* \* \*